UNITED STATES PATENT OFFICE 2,480,990

PREPARATION OF CYCLOPENTANE CARBOXALDEHYDES AND DERIVATIVES THEREOF

Richard R. Whetstone, Berkeley, Calif., assignor to Shell Development Company, San Francisco, Calif., a corporation of Delaware No Drawing. Application April 11, 1947, Serial No. 740,964

19 Claims. (Cl. 260—598)

This invention relates to a method of preparing cyclopentane carboxaldehydes and derivatives thereof. More particularly, the present invention relates to a method of preparing cyclopentane carboxaldehydes and derivatives thereof which comprises the catalytic vapor phase dehydration of a tetrahydropyran-2-methanol to form a cyclopentane carboxaldehyde containing the same number of carbon atoms as the tetrahydropyran-2-methanol. The cyclopentane carboxaldehyde thus prepared may be converted in known manner to various of its derivatives or, in accordance with one aspect of the invention, the conversion, such as hydrogenation, may be effected as least in part simultaneously with the dehydration step of the process.

The process of the present invention is applicable generally to the conversion of tetrahydropyran-2-methanols that may be brought into the vapor phase under the conditions of the process, to cyclopentane carboxaldehydes that have the same number of carbon atoms as the tetrahydropyran-2-methanol that is employed. When use is made herein of the generic terms "a tetrahydropyran-2-methanol" and "tetrahydropyran-2-methanols," it is intended to refer to those derivatives of tetrahydropyran which have a methanol group (i. e., a hydroxymethyl group) directly attached to a carbon atom that is bonded to the heterocyclic oxygen atom in the tetrahydropyran ring. The tetrahydropyran ring may have attached to it only the methanol substituent group, as in the specific compound tetrahydropyran-2-methanol, or it may contain substituent groups in addition to the methanol group. Such substituent groups may be, for example, one or more organic substituent groups, such as alkyl, aryl, alkaryl, aralkyl, cycloalkyl, alkenyl, cycloalkenyl, alkenaryl, aralkenyl, or the like. The process of the present invention is most advantageously applied to the conversion of tetrahydropyran-2-methanols which contain only relatively non-reactive substituent groups, if any, in addition to the methanol group. The present process therefore preferably is applied to the conversion of those tetrahydropyran-2-methanols which contain only saturated and/or aromatic carbon-to-carbon bonds, in other words, to conversion of tetrahydropyran-2-methanol and its alkyl and/or aryl nuclear substitution products. Among the conversions which are within scope of the present invention are, for example, tetrahydropyran-2-methanol to cyclopentane carboxaldehyde; 2,6-dimethyltetrahydropyran-2-methanol to dimethylcyclopentane carboxaldehyde; 3,4-dimethyltetrahydropyran-2-methanol to dimethylcyclopentane carboxaldehyde; 5-methyltetrahydropyran-2-methanol to methylcyclopentane carboxaldehyde; 2,5-diethyltetrahydropyran-2-methanol to diethylcyclopentane carboxaldehyde; 3,4-dipropyltetrahydropyran-2-methanol to dipropylcyclopentane carboxaldehyde; 2-methyl-5-ethyltetrahydropyran-2-methanol to methylethylcyclopentane carboxaldehyde; 3-phenyltetrahydropyran-2-methanol to phenylcyclopentane carboxaldehyde; 3-cyclohexyltetrahydropyran-2-methanol to cyclohexylcyclopentane carboxaldehyde; 3-phenyl-4-methyltetrahydropyran-2-methanol to methylphenylcyclopentane carboxaldehyde; and conversions of analogous and homologous substituted tetrahydropyran-2-methanols to substituted cyclopentane carboxaldehydes.

A convenient method of preparing tetrahydropyran-2-methanols which may be converted in the present process to corresponding cyclopentane carboxaldehydes, such as tetrahydropyran-2-methanol and alkyl nuclear substitution products thereof, comprises subjecting an alpha, beta-olefinically unsaturated aldehyde such as acrolein or one of its homologs, preferably one of its beta-methylene homologs, to an elevated temperature in the presence of a polymerization inhibitor, to effect the condensation, or "dimerization" of the aldehyde to a compound in the 3,4-dihydro-1,2-pyran-2-carboxaldehyde series of compounds. For example, a solution of acrolein or of a homologous alpha, beta-unsaturated aldehyde in about an equal weight of benzol containing about 1% of hydroquinone based on the weight of the aldehyde, may be heated, say to 170° C., under a pressure sufficient to maintain the mixture liquid, for several hours. At the end of this time, there may be recovered from the mixture, as by fractional distillation, the dihydropyran carboxaldehyde resulting from the condensation of the unsaturated aldehyde. The dihydropyran carboxaldehyde then may be converted by hydrogenation to the corresponding tetrahydropyran-2-methanol. The hydrogenation may be effected so as to saturate the dihydropyran ring and to reduce the formyl group to a hydroxymethyl group in a single step. Raney nickel catalyst, among others, is effective as the hydrogenation catalyst. Relatively severe conditions of hydrogenation may be employed, such as temperatures during the hydrogenation in excess of 50° C. and hydrogen pressures in excess of 1500 pounds per square inch. The presence of a solvent medium such as methanol during the hydrogenation treatment may also favor the conversion to the tetrahydropyran-2-methanol. After completion of the hydrogenation, and following removal of the catalyst and the solvent, the tetrahydropyran-2-methanol may be purified as by fractional distillation prior to its application in the process of the present invention or, if desired, the less pure mixture may be subjected in its entirety to the present process. It will be understood, of course, that other methods may be employed for preparing the tetrahydropyran-2-methanols to which the present process is applicable. It will be understood, therefore, that the present invention need not be construed as limited in its applicability to those members of the herein defined class of tetrahydropyran-2-methanols that may be prepared from the alpha, beta-olefinically unsaturated aldehydes in accordance with the immediately foregoing description.

As the catalyst in the present process, there may be employed any one or more of the class of materials known to the art and customarily referred to as dehydration catalysts, i. e. substances having the power to promote the catalytic dehydration of organic compounds by the splitting out, or the removal of the elements of water from the organic molecule, with or without accompanying rearrangement of the carbon skeleton of the molecule. The catalyst which may be employed in the present process preferably is a solid dehydration catalyst and one that is inorganic in nature. One group of substances within the class known as dehydration catalysts and which is applicable in the present process comprises the oxides of the polyvalent metals of groups II, III, and IV of the periodic table of the elements. Within this group are included, for example, the divalent metal oxides such as zinc oxide, magnesium oxide, calcium oxide, and oxides of metals capable of assuming a higher valence state than divalent, including aluminum oxide, thorium oxide, zirconium oxide, lead oxide, silicon oxide, titanium oxide, and cerium oxide. Mixtures of oxides may be employed as the catalyst. Substances which would be converted, as by dehydration, under the conditions of the process to a catalytically active metal oxide or mixture of oxides, such as hydrates of the oxides, also are regarded as within this group of catalysts.

Inorganic salts having activity as dehydration catalysts may be employed as the dehydration catalyst in the process of the present invention. Such salts may be either acidic salts, neutral salts or basic salts. Inorganic salts having activity as dehydration catalysts and which may be employed as the catalyst include the phosphates, silicates, halides, aluminates, and other active salts, of the polyvalent metals of groups II, III and IV of the periodic table of the elements. By the term "phosphates," it is intended to include both the orthophosphates and the metaphosphates. Among the phosphates of the polyvalent metals are included, for example, the calcium phosphates, basic aluminum phosphate, magnesium phosphate, lead phosphate, calcium magnesium phosphate, etc. Complex acid phosphates, such as the phosphoric acid catalyst formed by calcining a mixture of a phosphoric acid and a siliceous material such as diatomaceous earth and sold commercially under the name of "Solid Phosphoric Acid Catalyst" also may be employed as the catalyst. (As sold commercially, the "Solid Phosphoric Acid Catalyst" may lead to the occurrence of excessive side reactions when employed without a prior, modifying treatment. In such cases, its applicability in the process may be enhanced by prior treatment with superheated steam in order to decrease or to modify its catalytic activity.) Other salts which have activity as dehydration catalysts and which may be employed in the process of the present invention include, for example, calcium sulfate, zinc sulfate, aluminum sulfate, thorium sulfate, lead sulfate, zinc chloride, iron chloride, nickel sulfate, and the like.

The catalytically active, complex inorganic polyacids, represented by silicotungstic acid, silicovanadic acid, titanimolybdic acid, manganimolybdic acid and the like, also may be employed as the dehydration catalyst.

The dehydration catalyst may be composed solely of one catalytically active compound or it may comprise a mixture of two or more catalytically active compounds of metals. Mixtures of oxides, such as mechanical mixtures or chemically combined mixtures of oxides of metals, mixtures of salts, or mixtures of a metal oxide with a catalytically active metal salt, thus may be employed. For example, a metal oxide such as alumina may have mixed with it an oxide of another metal or a salt of a metal, the second component being in itself catalytically active or, alternatively, serving to icrease or to modify the activity of the primary catalyst in relation to the present process.

Although a wide variety of substances having activity as dehydration catalysts is suited to application in the present process, it generally is most convenient and preferable to employ one of the metal oxides of the character referred to hereinbefore as the dehydration catalyst in the present process. From the standpoint of cost and efficacy, it is particularly advantageous to employ as the dehydration catalyst an alumina having the characteristics of an activated alumina, i. e., an adsorptive alumina which is composed predominantly of alumina alpha monohydrate and/or gamma alumina. Such activated, or adsorptive, aluminas may be characterized as being substantially soluble in dilute aqueous solutions of the mineral acids, as compared to the non-adsorptive aluminas which are relatively insoluble therein. The activated aluminas which are suited to the present process may be either synthetic activated aluminas, or they may be prepared from a naturally occurring alumina or ores rich in a hydrate of alumina, e. g., bauxite, diaspore, or hydrargillite. Activated aluminas that are suited to the objects of the present invention also may be prepared by treatment of synthetic alumina gels, by treatment of a crystalline material such as crystalline alpha alumina trihydrate crystallized from alkali aluminate solutions, or according to other procedures known to those skilled in the art of preparing activated or adsorptive aluminas.

According to one aspect of the present invention the catalyst may comprise, in addition to the component having activity as a dehydration catalyst, a second component which may have activity as a hydrogenation catalyst. The process leading to the dehydration of the tetrahydropyran-2-methanol thus may be executed in the presence of molecular hydrogen and a hydrogenation catalyst, thereby effecting either partial or complete reduction of the cyclopentane carboxaldehyde to the corresponding cyclopentanemethanol coincident with its formation and in the same reaction system employed for the dehydration. Depending upon the particular dehydration catalyst that is used, the hydrogenation catalyst may be either mixed mechanically with the dehydration catalyst, or the dehydration catalyst may be coated, impregnated, or otherwise combined with the hydrogenation catalyst to provide an intimate catalyst mixture having both dehydration and hydrogenation catalytic activity. The dehydration-hydrogenation catalyst may comprise, in addition to one or more of the hereinbefore mentioned dehydration catalysts, any of the hydrogenation catalysts employed in the art for the catalytic reduction of organic compounds, such as a free metal hydrogenation catalyst or an active compound of a metal. In certain cases, one metal oxide, for example, may be active as both a dehydration catalyst and a hydrogenation catalyst. Among the hydrogenation catalysts which thus may be employed are included the free metals Pt, Ni, Pd, Au, Co, Fe, Cu, Ag, Mo, Cr, W, Mn, and mixtures thereof, and compounds of the same, such as their oxides and sulfides. One effective dehydration-hydrogenation catalyst may be prepared, for example, by impregnating activated alumina with an aqueous solution of chromic acid and drying the resulting mass. Other suitable dehydration-hydrogenation catalysts may be prepared similarly.

The dehydration of the tetrahydropyran-2-methanol may be effected by contacting it in the vapor state with the dehydration catalyst at an elevated temperature and for a suitable time. Any appropriate apparatus may be employed for the execution of the process, although the process most conveniently may be executed in an apparatus adapted to continuous operations. A stream of the tetrahydropyran-2-methanol thus may be passed into contact with the dehydration catalyst positioned in a suitable heated reaction tube, at a temperature and rate of flow which favor the desired dehydration reaction. The dehydration reaction is favored by reaction temperatures of about 250° C. or higher, and preferably at least about 270° C. Considerably higher temperatures may be employed, up to temperatures causing excessive thermal decomposition of organic materials present. Temperatures as high as 550° C. frequently may be employed. A preferred range of temperatures is from about 300° C. to about 450° C.

The rate of flow of the stream of tetrahydropyran-2-methanol may be varied considerably, depending upon the particular catalyst that is employed, the reaction temperature, and the conversion per pass that is desired. The rate of flow conveniently may be expressed in terms of liquid volumes of the tetrahydropyran-2-methanol passed into contact with one volume of catalyst per hour. Expressed in these units, rates of flow of from about .1 to about 1.5 are generally satisfactory, a preferred range being from about .5 to about 1.0. However, these values are not highly critical, and as the circumstances indicate or dictate either greater or smaller rates of flow may be employed if desirable.

The tetrahydropyran-2-methanol may be introduced into the reaction zone and/or into contact with the catalyst in either the liquid or gaseous state. It may be volatilized in a preheater and a stream of the vapors passed into contact with the catalysts, or it may be introduced as a liquid directly into the reaction vessel or reaction tube, volatilization occurring upon contact of the tetrahydropyran-2-methanol with the heated catalyst and/or the walls of the reaction chamber. The process may be executed either at atmospheric pressures or at pressures above or below atmospheric pressures. If desired, an inert gas such as nitrogen, carbon dioxide, or methane, may be mixed with the vapors of the tetrahydropyran-2-methanol contacted with the catalyst, or essentially undiluted vapors of the tetrahydropyran-2-methanol may be contacted with the catalyst. If it is desired to effect the simultaneous dehydration of the tetrahydropyran-2-methanol and reduction of the products of dehydration, a gaseous mixture comprising the tetrahydropyran-2-methanol and hydrogen may be contacted with a dehydration-hydrogenation catalyst of the character herinbefore referred to. The amount of hydrogen present in the gaseous mixture may be either greater or less than the amount theoretically required to reduce the dehydration products, although greater efficiency of operation may be favored by the presence of a moderate excess of hydrogen over the theoretical requirement. On the basis of the amount of the tetrahydropyran-2-methanol, upwards from about .5 mole hydrogen per mole of the tetrahydropyran-2-methanol may be employed satisfactorily. Superatmospheric pressures of hydrogen may be employed.

The products formed by the present process may be recovered in any suitable way from the gaseous mixture leaving the reaction tube. In addition to the cyclopentane carboxaldehyde formed by the dehydration and isomerization of the tetrahydropyran-2-methanol, there may be present other products of either side or partial reaction that are formed during the process. Such other products, which may comprise carbonylic products when the dehydration is effected in the absence of molecular hydrogen, appear to include acyclic hydroxy aldehydes, unsaturated carbonylic compounds, heterocyclic carbonylic compounds, and the like. For example, the dehydration of tetrahydropyran-2-methanol in the presence of aluminum phosphate or other dehydration catalysts, and catalytic reduction of the resultant mixture, has been found to lead to the formation of small amounts of hexamethylene glycol. This and other products that are formed according to the process of the invention, constitute useful products of the process that advantageously may be recovered and further purified in any suitable manner.

The gaseous mixture leaving the reaction vessel may be condensed, and the products separated by fractional distillation, by treatment with selective solvents, by chemical means, or otherwise. The mixture of products formed by the dehydration of a tetrahydropyran-2-methanol of the present class may at times be less readily separated into its individual components, as by fractional distillation, than for example the corresponding mixture of hydrogenated dehydration products. If it is desired ultimately to prepare the hydrogenated products, i. e., the cyclopentane methanols, it therefore may be advantageous to defer complete separation of the reaction mixture into its components until after the hydrogenation has been completed.

The following examples will serve to illustrate certain of the numerous possible specific embodiments of the invention. In the first example there is illustrated an application of the process to the preparation of cyclopentane carboxaldehyde and its recovery in an essentially pure state by the dehydration of tetrahydropyran-2-methanol. In certain of the remaining examples, it was found more convenient to hydrogenate the crude mixture of dehydration products and to separate the resultant hydroxylic compounds. It will be appreciated that in such examples the subsequent hydrogenation could have been omitted and the cyclopentanecarboxaldehyde recovered from the dehydration mixture by methods similar to the one employed in the first example.

*Example I*

One hundred sixty-five cubic centimeters of Grade A activated alumina were placed in a stainless-steel reaction tube having a length of 101 centimeters and a diameter of 1.7 centimeters. Tetrahydropyran-2-methanol in the gaseous state was passed through the tube under atmospheric pressure at 420° C. to 450° C. and at a rate of flow corresponding to .88 liquid volumes per volume of catalyst per hour. The mixture leaving the tube was passed through a water-cooled condenser. The liquefied portion separated into two phases—an aqueous phase and an organic phase. From 348 grams of tetrahydropyran-2-methanol there were obtained 237 grams of the organic phase and 101 grams of the aqueous phase. A small amount of gas not condensed at tap-water temperatures was formed.

The organic phase was separated, freed from water, and distilled. The fraction distilling up to 120° C. under atmospheric pressure was removed, and the fraction distilling thereafter up to 68° C. under 15 mm. pressure and amounting to 128 grams, was collected. Upon redistillation of this collected fraction, there were recovered 63 grams of cyclopentanecarboxaldehyde distilling at 135.9° C. to 138° C. (literature value, 136° C.), having a refractive index ($n_D^{20}$) of 1.4423 and forming a semicarbazone melting at 120° C. to 122° C. (literature value, 123° C. to 124° C.). An additional 40 grams of less pure cyclopentanecarboxaldehyde also was recovered as fractions distilling between 127° C. and 135.9° C., and 138° C. and 150° C.

*Example II*

Five hundred parts of tetrahydropyran-2-methanol were passed through the reaction tube used in Example I containing fresh Grade A activated alumina, under atmospheric pressure at 320° C. to 340° C. and at a rate of flow corresponding to .7 liquid volume per volume of catalyst per hour. The condensed mixture of products was separated into 76 parts of water and 422 parts of organic materials. The organic portion, after removal of 42 parts by distillation from 42° C. to 114° C. under atmospheric pressure, was treated with hydrogen under 1000 pounds per square inch pressure in the presence of Raney nickel hydrogenation catalyst at 125° C., until hydrogen absorption ceased. After removal of the catalyst, the mixture thus obtained was fractionally distilled. The following fractions were collected:

| No. | Amount (Parts) | Distillation temperature (° C., maximum) | Distillation Pressure (mm. Hg, minimum, at maximum temperature) |
|---|---|---|---|
| 1 | 15 | 83.0 | 40 |
| 2 | 164 | 89.0 | 40 |
| 3 | 94 | 98.0 | 1-2 |
| 4 | 10 | 98.2 | 1 |
| 5 | 29 | bottoms | |

Fraction 2 was steam distilled (to remove unreacted tetrahydropyran-2-methanol), dried, and redistilled. There were collected 103 parts of cyclopentanemethanol distilling at 162.2° to 164.9° C. (literature value, 162.5° to 163.5° C.) and an additional 31 parts distilling up to 167 C. Fraction 4 crystallized upon standing. The crystals were identified as crystals of hexamethylene glycol. After washing with ether the crystals melted at 39.5° to 40.5° C., both alone and when mixed with an authentic sample of hexamethylene glycol which had a melting point of 39° to 40° C.

*Example III*

A catalyst was prepared by impregnating Grade A activated alumina with an aqueous solution of chromic acid and drying the impregnated alumina. The catalyst contained 15 per cent by weight of chrome.

A mixture of gaseous tetrahydropyran-2-methanol and hydrogen in 2:1 molar ratio was passed into contact with this catalyst in the heated reaction tube that was employed in Example I, at a catalyst temperature of 375° C. and at a rate of flow of .33 liquid volume of the tetrahydropyran-methanol per volume of catalyst per hour. The partially hydrogenated organic products of the dehydration were separated from the water formed in the reaction, additionally hydrogenated in the presence of Raney nickel hydrogenation catalyst at 125° C. and 1500 pounds per square inch of hydrogen until no more hydrogen was absorbed, and distilled. Cyclopentanemethanol was recovered as a fraction distilling from 73.4° C. to 78° C. under 20 millimeters mercury pressure, in an amount corresponding to 59 per cent by weight of the mixture that was subjected to distillation.

*Example IV*

Dimethyltetrahydropyran-2-methanol was prepared from methacrolein according to the method disclosed in the copending application Serial No. 713,455 filed December 2, 1946. A gaseous stream of the dimethyltetrahydropyran-2-methanol was passed into contact with Grade A activated alumina in the reaction tube employed in the experiment in Example I, at a temperature of 350° C. and a rate of flow corresponding to .67 liquid volume per volume of catalyst per hour. The mixture leaving the reaction tube was collected. From 227 parts of the dimethyltetrahydropyran-2-methanol there were obtained, after removal of water, 149 parts of crude products. Upon distillation of the crude products there were obtained 25 parts of dimethylcyclopentanecarboxaldehyde distilling between 63.2° and 66.6° C. under a pressure of 15 millimeters of mercury and having a refractive index ($n_D^{20}$) of 1.4520. The dimethylcyclopentanecarboxaldehyde thus prepared was found to contain 75.87 per cent carbon and 10.88 per cent hydrogen (calculated for $C_8H_{14}O$: 76.05 per cent and 11.17 per cent, respectively). It was found to have a carbonyl value of 0.715 equivalent per 100 grams compared to a calculated value of 0.793 equivalent per 100 grams.

*Example V*

Tetrahydropyran-2-methanol was passed into contact with anhydrous calcium sulfate in the reaction tube employed in Example I, at a temperature of 450° C. and at a rate of flow of .5 liquid volume of tetrahydropyran-2-methanol per volume of catalyst per hour. The products leaving the reaction tube were collected and hydrogenated in the presence of Raney nickel catalyst at 125° C. and 1500 pounds per square inch of hydrogen until hydrogen absorption ceased. Distillation of the hydrogenated products led to the recovery of cyclopentanemethanol in a conversion of 37 per cent based on the amount of tetrahydropyran-2-methanol applied, and in a yield of 42 per cent based on the amount of the tetrahydropyran-2-methanol consumed. Eleven per cent of the tetrahydropyran-2-methanol was recovered.

*Example VI*

A basic aluminum phosphate catalyst that had been prepared according to the disclosures of United States Patent No. 2,365,623 was placed in the reaction tube that was employed in Example I. Tetrahydropyran-2-methanol was passed in the gaseous state into contact with the catalyst at a temperature of 325° C. and at a rate of flow of .55 liquid volume of tetrahydropyran-2-methanol per volume of catalyst per hour. The resultant mixture was collected and hydrogenated according to the method employed in the preceding example. Upon distillation of the hydrogenated products, cyclopentanemethanol was recovered in a conversion of 30 per cent and a yield of 38 per cent. There also was recovered an amount of hexamethylene glycol corresponding to a conversion of tetrahydropyran-2-methanol of 8 per cent and to a yield of 10 per cent. Unreacted tetrahydropyran-2-methanol was recovered in an amount corresponding to 20 per cent of the amount applied.

*Example VII*

A catalyst was prepared by precipitating silica on 10 to 14 mesh Grade A activated alumina from an aqueous solution of sodium silicate by addition of acid. The catalyst contained 5 per cent of silica (dryweight basis) and consisted of porous granules having a specific surface area of from 309 to 340 square meters per gram. Tetrahydropyran-2-methanol was passed into contact with the catalyst in the reaction tube employed in Example I, at a catalyst temperature of 300° C. and a rate of flow of .59 liquid volume of tetrahydropyran-2-methanol per volume of catalyst per hour. The resultant mixture of products was hydrogenated according to the method employed in Example V, and distilled. Cyclopentanemethanol was recovered in a conversion of 42 per cent based on the tetrahydropyran-2-methanol applied. Of the tetrahydropyran-2-methanol applied, 42 per cent was recovered unreacted.

We claim as our invention:

1. Process for the direct production of cyclopentanecarboxaldehyde which comprises subjecting tetrahydropyran-2-methanol in the gaseous state to the action of activated alumina at a temperature greater than about 250° C.

2. Process for the direct production of cyclopentanecarboxaldehyde which comprises passing tetrahydropyran-2-methanol into contact with a catalyst comprising activated alumina at a temperature from about 300° C. to about 450° C.

3. Process for the direct production of a nuclearly-substituted cyclopentanecarboxaldehyde which comprises subjecting a nuclearly-substituted tetrahydropyran-2-methanol in the gaseous state to the action of activated alumina at a temperature greater than about 250° C.

4. Process for the direct production of a nuclearly-substituted cyclopentanecarboxaldehyde which comprises passing a nuclearly-substituted tetrahydropan-2-methanol into contact with a catalyst comprising activated alumina at a temperature from about 300° C. to about 450° C.

5. Process for the direct production of cyclopentanecarboxaldehyde which comprises contacting tetrahydropyran-2-methanol with a metal oxide dehydration catalyst at a temperature from about 250° C. to about 500° C.

6. Process for the direct production of a nuclearly-substituted cyclopentanecarboxaldehyde which comprises contacting a nuclearly-substituted tetrahydropyran-2-methanol with a metal oxide dehydration catalyst at a temperature from about 250° C. to about 500° C.

7. Process for the direct production of dimethylcyclopentanecarboxaldehyde which comprises passing dimethyltetrahydropyran-2-methanol into contact with a catalyst comprising activated alumina at a temperature from about 300° C. to 450° C.

8. Process for the direct production of a cyclopentanecarboxaldehyde which comprises contacting a tetrahydropyran-2-methanol with a metal oxide dehydration catalyst at a temperature from abut 250° C. to about 500° C.

9. Process for the direct production of cyclopentanecarboxaldehyde which comprises contacting tetrahydropan-2-methanol with a dehydration catalyst comprising a phosphate of a polyvalent metal at a temperature from about 250° C. to about 500° C.

10. Process for the direct production of cyclopentanecarboxaldehyde which comprises contacting tetrahydropyran-2-methanol with a dehydration catalyst comprising a sulfate of a polyvalent metal at a temperature from about 250° C. to about 500° C.

11. Process for the direct production of a cyclopentanecarboxaldehyde which comprises contacting a tetrahydropyran-2-methanol with a dehydration catalyst comprising silica and alumina at a temperature from about 250° C. to about 500° C.

12. Process for the direct production of cyclopentanecarboxaldehyde which comprises passing tetrahydropyran-2-methanol into contact with a dehydration catalyst at a temperature from about 250° C. to about 500° C.

13. Process for the direct production of a cyclopentanecarboxaldehyde which comprises subjecting a tetrahydropyran-2-methanol to the action of a dehydration catalyst at a temperature from about 250° C. to about 500° C.

14. The method of producing cyclopentanecarboxaldehyde which consists in dehydrating and isomerizing tetrahydropyran-2-methanol to form therefrom in a single step cyclopentanecarboxaldehyde.

15. The method of producing a cyclopentanecarboxaldehyde which consists in dehydrating and isomerizing a tetrahydropyran-2-methanol to form therefrom in a single step a cyclopentanecarboxaldehyde containing the same number of carbon atoms as the tetrahydropyran-2-methanol.

16. Process for the direct production of cyclopentanemethanol which comprises contacting tetrahydropyran-2-methanol in the gaseous state in the presence of molecular hydrogen with a dehydration-hydrogenation catalyst comprising chromium oxide and alumina at a temperature between about 250° C. and about 500° C.

17. Process for the direct production of cyclopentanemethanol which comprises contacting tetrahydropyran-2-methanol in the gaseous state in the presence of molecular hydrogen with a solid catalyst comprising activated alumina and a catalyst for hydrogenation reactions at a temperature between about 250° C. and about 500° C.

18. Process for the direct production of a cyclopentanemethanol which comprises contacting a tetrahydropyran-2-methanol in the gaseous state in the presence of molecular hydrogen with a dehydration-hydrogenation catalyst at a temperature upwards from about 250° C.

19. Process which comprises contacting a tetrahydropyran-2-methanol with a dehydration catalyst at a temperature from about 250° C. to about 500° C. and hydrogenating the products thereof to produce a cyclopentanemethanol.

RICHARD R. WHETSTONE.

REFERENCES CITED

The following references are of record in the file of this patent:

UNITED STATES PATENTS

| Number | Name | Date |
|---|---|---|
| 2,365,623 | Bremner et al. | Dec. 19, 1944 |
| 2,368,186 | Wickert et al. | Jan. 30, 1945 |

OTHER REFERENCES

Sawyer et al., "Organic Syntheses," vol. 23 (1943), pages 25–27.